United States Patent
Wang et al.

(10) Patent No.: US 12,308,923 B2
(45) Date of Patent: May 20, 2025

(54) PRECODING MATRIX INDICATION METHOD, USER EQUIPMENT, AND ACCESS DEVICE

(71) Applicant: Huawei Technologies Co., Ltd., Shenzhen (CN)

(72) Inventors: Xiaohan Wang, Shanghai (CN); Shengwu Huang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/309,197

(22) Filed: Apr. 28, 2023

(65) Prior Publication Data

US 2023/0299834 A1 Sep. 21, 2023

Related U.S. Application Data

(63) Continuation of application No. PCT/CN2020/126611, filed on Nov. 4, 2020.

(51) Int. Cl.
*H04B 7/06* (2006.01)
*H04B 7/0456* (2017.01)

(52) U.S. Cl.
CPC ......... *H04B 7/0639* (2013.01); *H04B 7/0478* (2013.01)

(58) Field of Classification Search
CPC .................... H04B 7/0639; H04B 7/0478
See application file for complete search history.

(56) References Cited

U.S. PATENT DOCUMENTS

2020/0295812 A1    9/2020   Rahman et al.

FOREIGN PATENT DOCUMENTS

| AU | 2016210741 A1 | 9/2016 |
|---|---|---|
| CN | 102349243 A | 2/2012 |

(Continued)

OTHER PUBLICATIONS

3rd Generation Partnership Project; Technical Specification Group Radio Access Network; NR;Physical layer procedures for data(Release 16), 3GPP TS 38.214 V16.3.0, Sep. 2020, 166 pages.

(Continued)

*Primary Examiner* — Janice N Tieu
(74) *Attorney, Agent, or Firm* — Slater Matsil, LLP

(57) ABSTRACT

Embodiments of the present disclosure provide a precoding matrix indication method, user equipment, and an access device. The precoding matrix indication method includes: generating indication information, where the indication information indicates $K^{NZ}-v$ non-zero weighting coefficients, the $K^{NZ}-v$ non-zero weighting coefficients belong to $K^{NZ}$ non-zero weighting coefficients, v is a quantity of transport layers, the $K^{NZ}$ non-zero weighting coefficients are for constructing a precoding matrix, and the precoding matrix is constructed based on at least the $K^{NZ}$ non-zero weighting coefficients, m spatial domain vectors, and n frequency domain vectors, where the indication information is generated in a first manner when a first preset condition is met, or the indication information is generated in a second manner when a second preset condition is met; and sending the indication information.

12 Claims, 3 Drawing Sheets

(56) References Cited

FOREIGN PATENT DOCUMENTS

| CN | 106487435 A | 3/2017 |
|---|---|---|
| CN | 111865372 A | 10/2020 |
| JP | 2012129580 A | 7/2012 |
| WO | 2020125510 A1 | 6/2020 |
| WO | 2020143699 A1 | 7/2020 |
| WO | 2020147104 A1 | 7/2020 |

OTHER PUBLICATIONS

Samsung, "Feature lead summary for MU-MIMO CSI", 3GPP TSG BAN WGI#100 bis, R1-2002138, e-Meeting, Apr. 20-30, 2020, 10 Pages.

Hindy, Ahmed et al., "CSI Feedback Overhead Reduction for 5G Massive MIMO Systems," XP033737618, Jan. 6, 2020, 5 pages.

CATT: "Discussions on Type II CSI enhancement", 3GPP TSG RAN WG1 #96bis, R1-1904560, XP051699786, Apr. 8-12, 2019, 12 pages, Xi'an, China.

Fraunhofer, Iis et al., "Enhancements on Type-II CSI reporting", 3GPP TSG-RAN1#97, R1-1907053, XP051728501, May 13-17, 2019, 16 pages, Reno, USA.

3GPP TSG RAN WG1 Meeting #103-e, R1-2007592, "Discussion on CSI enhancements for Rel-17", Huawei, HiSilicon, E-meeting, Oct. 26-Nov. 13, 2020, total 18 pages.

600

PRECODING MATRIX INDICATION METHOD, USER EQUIPMENT, AND ACCESS DEVICE

CROSS-REFERENCE TO RELATED APPLICATIONS

This application is a continuation of International Application No. PCT/CN2020/126611, filed on Nov. 4, 2020, the disclosure of which is hereby incorporated by reference in its entirety.

TECHNICAL FIELD

Embodiments of the present disclosure relate to communication technologies, and in particular, to a precoding matrix indication method, user equipment, and an access device.

BACKGROUND

Emergence of a multiple-input multiple-output (MIMO) technology brings a revolutionary change to wireless communication. In the MIMO technology, a plurality of antennas are deployed on a transmit end device and a receive end device, so that performance of a wireless communication system can be significantly improved. For example, in a diversity scenario, the MIMO technology can effectively improve transmission reliability; and in a multiplexing scenario, the MIMO technology can increase a transmission throughput manyfold.

A precoding technology is an important branch of the MIMO technology. In the technology, a to-be-transmitted signal is processed by using a precoding matrix that matches a channel attribute, so that a precoded to-be-transmitted signal matches a channel. Therefore, a transmission process is optimized, and received signal quality (for example, an SINR) is improved. Currently, the precoding technology has been used in a plurality of wireless communication standards, for example, but not limited to, LTE and 5G NR.

Currently, a channel information reporting solution referred to as enhanced type II is introduced into the 5G NR R16 protocol that is being discussed. The reporting solution is used to report a plurality of parameters, to construct a precoding matrix. Specifically, according to a section in the current R16 protocol 38.214 V16.3.0, for example, but not limited to, Section 5.2.2.2.5, the foregoing precoding matrix is constructed based on at least a plurality of weighting coefficients, a plurality of spatial domain components (for example, spatial domain vectors), and a plurality of frequency domain components (for example, frequency domain vectors). However, at least a part of the weighting coefficients, the spatial domain components, and the frequency domain components, for example, at least a part of the weighting coefficients, and/or at least a part of the spatial domain components, and/or at least a part of the frequency domain components, need to be reported by a terminal to a base station. Therefore, in a section of the latest protocol version 38.214 V16.3.0, for example, but not limited to, Section 5.2.3, reporting of the foregoing parameters is specified in detail, to describe specific parameters that are in the foregoing parameters and that need to be reported and a specific reporting manner of the parameters. However, because a large quantity of parameters need to be reported, 38.214 V16.3.0 is not perfect. Therefore, further optimization is required.

SUMMARY

In view of this, it is necessary to provide a precoding matrix indication method, to optimize an existing indication solution.

According to one aspect of embodiments of the present disclosure, a precoding matrix indication method is provided. The method includes:

generating indication information, where the indication information indicates $K^{NZ}$-v non-zero weighting coefficients, the $K^{NZ}$-v non-zero weighting coefficients belong to $K^{NZ}$ non-zero weighting coefficients, v is a quantity of transport layers, the $K^{NZ}$ non-zero weighting coefficients are used to construct a precoding matrix, and the precoding matrix is constructed based on at least the $K^{NZ}$ non-zero weighting coefficients, m spatial domain vectors, and n frequency domain vectors, where the indication information is generated in a first manner when a first preset condition is met, or the indication information is generated in a second manner when a second preset condition is met; and sending the indication information.

In a feasible solution, the first preset condition is related to a value of a first parameter.

In a feasible solution, the second preset condition is related to the value of the first parameter.

In a feasible solution, the first parameter is $\lceil K^{NZ}/2 \rceil - v$.

In a feasible solution, the first preset condition includes at least the following condition: $\lceil K^{NZ}/2 \rceil - v > 0$.

In a feasible solution, the first preset condition includes at least the following condition: $\lceil K^{NZ}/2 \rceil - v \geq 0$.

In a feasible solution, the second preset condition includes at least the following condition: $\lceil K^{NZ}/2 \rceil - v \leq 0$.

In a feasible solution, the second preset condition includes at least the following condition: $\lceil K^{NZ}/2 \rceil - v < 0$.

In a feasible solution, the first preset condition includes at least the following condition: $\lceil K^{NZ}/2 \rceil - v > 0$, and the second preset condition includes at least the following condition: $\lceil K^{NZ}/2 \rceil - v \leq 0$.

In a feasible solution, the first preset condition includes at least the following condition: $\lceil K^{NZ}/2 \rceil - v \geq 0$, and the second preset condition includes at least the following condition: $\lceil K^{NZ}/2 \rceil - v < 0$.

Another aspect of this application provides a computer-readable storage medium. The computer-readable storage medium stores instructions. When the instructions are run on a computer, the computer is enabled to perform the method according to each of the foregoing aspects.

According to embodiments of the present disclosure, parameters related to the precoding matrix may be sent in different manners based on different conditions, to resolve a problem that a current protocol is not perfect, so that a reporting solution is applicable to a plurality of configuration scenarios.

DETAILED DESCRIPTION OF ILLUSTRATIVE EMBODIMENTS

Figure 1:
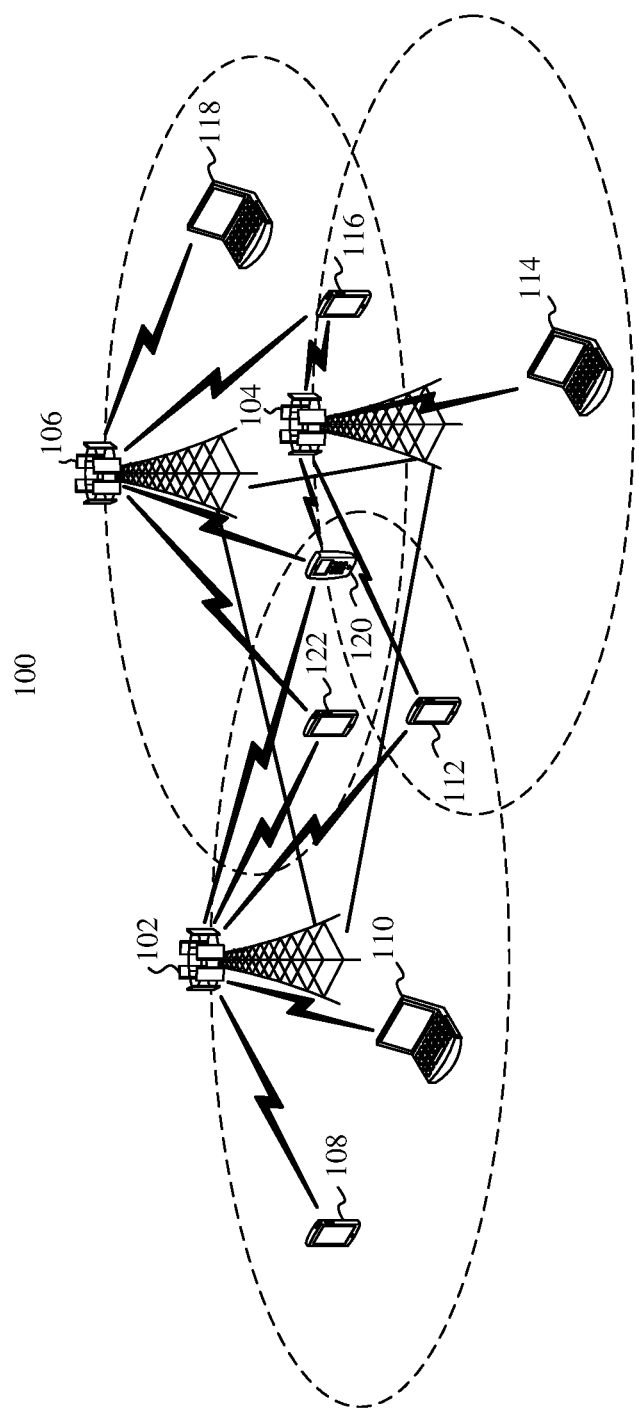
FIG. 1 is an example schematic diagram of a wireless communication network 100 according to an embodiment of the present disclosure.

FIG. 1 is an example schematic diagram of a wireless communication network 100 according to an embodiment of the present disclosure. As shown in FIG. 1, the wireless communication network 100 includes base stations 102 to 106 and terminal devices 108 to 122. The base stations 102 to 106 may communicate with each other through backhaul links (as shown by straight lines between the base stations 102 to 106). The backhaul link may be a wired backhaul link (for example, an optical fiber or a copper cable) or a wireless backhaul link (for example, a microwave). The terminal devices 108 to 122 may communicate with the corresponding base stations 102 to 106 through radio links (for example, as shown by fold lines between the base stations 102 to 106 and the terminal devices 108 to 122).

The base stations 102 to 106 usually provide, as access devices, a radio access service for the terminal devices 108 to 122 that usually serve as user equipment. Specifically, each base station is corresponding to one service coverage area (which may also be referred to as a cellular, as shown by each elliptical area in FIG. 1), and a terminal device entering the area can communicate with the base station by using a radio signal, to receive a wireless access service provided by the base station. The service coverage areas of the base stations may overlap. A terminal device in an overlapping area may receive radio signals from a plurality of base stations. Therefore, these base stations may coordinate with each other, to provide a service for the terminal device. For example, the plurality of base stations may provide the service for the terminal device in the overlapping area by using a coordinated multipoint transmission/ reception (CoMP) technology. For example, as shown in FIG. 1, there is an overlapping area between the service coverage area of the base station 102 and the service coverage area of the base station 104, and the terminal device 112 is located in the overlapping area. Therefore, the terminal device 112 may receive radio signals from the base station 102 and the base station 104. The base station 102 and the base station 104 may coordinate with each other, to provide a service for the terminal device 112. For another example, as shown in FIG. 1, a common overlapping area exists in the service coverage areas of the base stations 102, 104, and 106, and the terminal device 120 is located in the overlapping area. Therefore, the terminal device 120 may receive radio signals from the base stations 102, 104, and 106. The base stations 102, 104, and 106 may coordinate with each other, to provide a service for the terminal device 120.

Depending on a wireless communication technology in use, a base station may also be referred to as a NodeB, an evolved NodeB (eNodeB), an access point (AP), and the like. In addition, based on sizes of provided service coverage areas, base stations may be further classified into a macro base station configured to provide a macro cell, a micro base station configured to provide a micro cell, a pico base station configured to provide a pico cell, a femto base station configured to provide a femto cell, and the like. With evolution of the wireless communication technology, a future base station may also use another name.

The base station usually includes a plurality of parts, for example, but not limited to, a baseband part, a radio frequency part, and an antenna array part.

The baseband part is configured to perform a plurality of baseband processing operations, for example, but not limited to, encoding and decoding, modulation and demodulation, precoding, and time-frequency conversion. In a specific implementation process, the baseband part is usually implemented by, for example, but not limited to, a baseband unit (BBU).

The radio frequency part is configured to perform a plurality of radio frequency processing operations, for example, but not limited to, intermediate frequency processing and filtering. In a specific implementation process, the radio frequency part is usually implemented by, for example, but not limited to, a radio frequency unit (RFU).

Antenna arrays may be classified into an active antenna array and a passive antenna array, and are responsible for transmitting and receiving signals.

Product forms of the base station are very rich. For example, in a product implementation process, the BBU and the RFU may be integrated in a same device, and the device is connected to the antenna array by using a cable (for example, but not limited to, a feeder). Alternatively, the BBU and the RFU may be separately disposed, and the BBU and the RFU are connected by using an optical fiber, and communicate with each other by using, for example, but not limited to, a common public radio interface (CPRI) protocol. In this case, the RFU is usually referred to as an remote radio unit (RRU), and is connected to the antenna array by using a cable. In addition, the RRU may further be integrated with the antenna array. For example, an active antenna unit (AAU) product in the market currently uses this structure.

In addition, the BBU may be further decomposed into a plurality of parts. For example, the BBU may be further subdivided into a central unit (CU) and a distributed unit (DU) based on real-time performance of a processed service. The CU processes non-real-time protocols and services, and the DU processes physical-layer protocols and real-time services. Further, a part of physical layer functions may be further separated from the BBU or the DU and integrated into the AAU.

It can be learned from the foregoing descriptions that the base station may include a plurality of parts, and there are a plurality of different product forms. In this case, the technical solution described in embodiments of the present disclosure may involve only one or more parts of the base station, or may involve the entire base station. Therefore, the base station in embodiments of the present disclosure may be a base station product that includes only several parts for implementing the technical solution in embodiments of the present disclosure, or may be the entire base station. The several parts may include, for example, but not limited to, one or more of the foregoing baseband part, radio frequency part, antenna array, BBU, RRU, RFU, AAU, CU, and DU. Further, the technical solution provided in embodiments of the present disclosure may be implemented only by a corresponding chip in each of the several parts. In each part, the technical solution provided in embodiments of the present disclosure may involve one chip, or may involve a plurality of chips. It can be learned that the technical solution provided in embodiments of the present disclosure may be implemented by the entire base station, may be implemented by the several parts of the base station, or may be implemented by one or more chips in these parts, that is, implemented by one or more chips in the base station. For example, a technical solution may be implemented only by a part that is of the base station and that is related to baseband processing. Further, the technical solution may be implemented by the BBU, implemented by the CU, implemented by the DU, jointly implemented by the CU and the DU, implemented by the AAU, or implemented by one or more chips in these devices.

Functions and product forms of the base station are clearly described in an existing technology. Details are not described in this specification.

The terminal devices 108 to 122 may be various wireless communication devices having a wireless communication function, for example, but not limited to, a mobile cellular phone, a cordless phone, a personal digital assistant (PDA), a smartphone, a notebook computer, a tablet computer, a wireless data card, a wireless modem (Modem), or a wearable device such as a smartwatch. With emergence of internet of things (IOT) technologies and vehicle-to-everything (V2X) technologies, more and more devices that do not have a communication function before, for example, but not limited to, a household appliance, a transportation vehicle, a tool device, a service device, and a service facility, start to obtain a wireless communication function by configuring wireless communication units, to access a wireless communication network, and accept remote control. Such a device has a wireless communication function because the device is configured with a wireless communication unit, and therefore also belongs to a scope of wireless communication devices. In addition, the terminal devices 108 to 122 may also be referred to as mobile stations, mobile devices, mobile terminals, wireless terminals, handheld devices, clients, or the like.

The base stations 102 to 106 and the terminal devices 108 to 122 each may be equipped with a plurality of antennas, to support a MIMO technology. Further, the base stations 102 to 106 and the terminal devices 108 to 122 may support not only a single-user MIMO (SU-MIMO) technology but also a multi-user MIMO (MU-MIMO) technology. The MU-MIMO technology may be implemented based on a space division multiple access (SDMA) technology. Because the plurality of antennas are configured, the base stations 102 to 106 and the terminal devices 108 to 122 may further flexibly support a single-input single-output (SISO) technology, a single-input multiple-output (SIMO) technology, and a multiple-input single-output (MISO) technology, to implement various diversity (for example, but not limited to, a transmit diversity and a receive diversity) and multiplexing technologies. The diversity technology may include, for example, but not limited to, a transmit diversity (TD) technology and a receive diversity (RD) technology. The multiplexing technology may be a spatial multiplexing technology. In addition, the foregoing technologies may further include a plurality of implementation solutions. For example, the transmit diversity technology may include a transmit diversity.

An important use of the MIMO technology is the transmit diversity (TD). In the transmit diversity, redundant transmission is performed on an original signal (for example, a symbol) in time, frequency, space (for example, antenna), or any combination of the three dimensions, to improve transmission reliability. In a specific implementation process, a quantity of times of redundant transmission may be set based on a channel model or channel quality, and an object of the redundant transmission may be the original signal or may be a processed original signal. Such processing may include, for example, but not limited to delay, negation, conjugation, rotation, processing obtained after derivation, evolution, and combination are performed on the foregoing processing, and the like.

Currently, commonly used transmit diversity manners include, for example, but are not limited to, a space-time transmit diversity (STTD), a space-frequency transmit diversity (SFTD), a time switched transmit diversity (TSTD), a frequency switched transmit diversity (FSTD), an orthogonal transmit diversity (OTD), a cyclic delay diversity (CDD), and a diversity manner obtained after the foregoing diversity manners are derived, evolved, and combined. For example, currently, transmit diversity manners such as space time block coding (STBC), space frequency block coding (SFBC), and CDD are used in an Long Term Evolution (LTE) standard.

The foregoing summarily describes the transmit diversity by using examples. A person skilled in the art should understand that, in addition to the foregoing examples, the transmit diversity further includes a plurality of other implementations. Therefore, the foregoing descriptions shall not be understood as a limitation on the technical solutions of the present disclosure, and the technical solutions of the present disclosure shall be understood as being applicable to various possible transmit diversity solutions.

In addition, the base stations 102 to 106 and the terminal devices 108 to 122 may perform communication by using various wireless communication technologies.

With development of communication theories and practice, more wireless communication technologies appear and gradually become mature. The wireless communication technologies include but are not limited to a time division multiple access (TDMA) technology, a frequency division multiple access (FDMA) technology, a code division multiple access (CDMA) technology, a time division-synchronous code division multiple access (TD-SCDMA) technology, an orthogonal frequency division multiple access (OFDMA) technology, a single carrier frequency division multiple access (SC-FDMA) technology, a space division multiple access (SDMA) technology, technologies evolved and derived from the technologies, and the like. As a radio access technology (RAT), the foregoing wireless communication technologies are adopted in a plurality of wireless communication standards, to construct various well-known wireless communication systems (or networks), including but not limited to a global system for mobile communications (GSM), CDMA2000, wideband CDMA (WCDMA), Wi-Fi defined in 802.11 series standards, worldwide interoperability for microwave access (WiMAX), long term evolution (LTE), LTE-advanced (LTE-A), 5G, evolved systems of these wireless communication systems, and the like. Unless otherwise specified, the technical solutions provided in embodiments of the present disclosure may be applied to the foregoing various wireless communication technologies and wireless communication systems. The terms "system" and "network" can be interchanged with each other.

It should be noted that the wireless communication network 100 shown in FIG. 1 is merely used as an example, and is not intended to limit the technical solutions of the present disclosure. A person skilled in the art should understand that in a specific implementation process, the wireless communication network 100 may further include another device, and a quantity of base stations and a quantity of terminal devices may alternatively be configured based on a specific requirement.

According to the currently drafted protocol R16 38.214 V16.3.0, when reporting weighting coefficients used to construct a precoding matrix, a terminal needs to report $K^{NZ}$−v non-zero weighting coefficients, where the non-zero weighting coefficients are further classified into a plurality of component parameters such as an amplitude and a phase; and report the non zero weighting coefficients by using, for example, but not limited to, a plurality of parameter groups. According to a section in 38.214 V16.3.0, for example, but not limited to, Section 5.2.3, specific parameters included in at least a part of parameters in the plurality of parameter groups may be related to a value of $\lceil K^{NZ}/2 \rceil$−v, where $K^{NZ}$ is a quantity of the non-zero coefficients, and v is a quantity of transport layers. For example, according to Section 5.2.3 CSI reporting using PUSCH in 38.214 V16.3.0, reporting parameters related to the precoding matrix may be included in three parameter groups for reporting: a group 0, a group 1, and a group 2. In addition, a specific reporting mode is specified in detail in the section. $\lceil K^{NZ}/2 \rceil$−v represents a quantity of parameters of a specific type included in the group 1. Therefore, usually, $\lceil K^{NZ}/2 \rceil$−v needs to be a valid value, that is, $\lceil K^{NZ}/2 \rceil$−v<0 or $\lceil K^{NZ}/2 \rceil$−v≥0. However, in a specific configuration scenario, the value of $\lceil K^{NZ}/2 \rceil$−v may be an invalid value, for example, $\lceil K^{NZ}/2 \rceil$−v≤0 or $\lceil K^{NZ}/2 \rceil$−v<0. It can be learned that if a related communication device, for example, but not limited to, an access device and/or user equipment, is used according to the current protocol, a problem may occur in the specific scenario. Therefore, a solution needs to be provided to resolve the foregoing problem.

Figure 2:
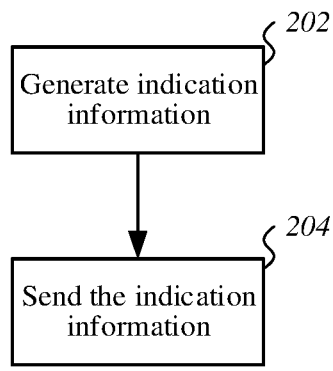
FIG. 2 is an example flowchart of a precoding matrix indication method 200 according to an embodiment of the present disclosure.

FIG. 2 is an example flowchart of a precoding matrix indication method 200 according to an embodiment of the present disclosure. In a specific implementation process, the method 200 may be performed by, for example, but not limited to, user equipment (for example, but not limited to, a terminal).

Step 202: Generate indication information. The indication information indicates $K^{NZ}$−v non-zero weighting coefficients, the $K^{NZ}$−v non-zero weighting coefficients belong to $K^{NZ}$ non-zero weighting coefficients, v is a quantity of transport layers, the $K^{NZ}$ non-zero weighting coefficients are used to construct a precoding matrix, and the precoding matrix is constructed based on at least the $K^{NZ}$ non-zero weighting coefficients, m spatial domain vectors, and n frequency domain vectors. The indication information is generated in a first manner when a first preset condition is met, or the indication information is generated in a second manner when a second preset condition is met.

Step 204: Send the indication information.

Specifically, the indication information may be understood as information that includes a related parameter indicating the $K^{NZ}$−v non-zero weighting coefficients. On this basis, the indication information may further include other information, for example, but not limited to, information indicating a spatial domain vector and/or a frequency domain vector. In addition, an indication manner of the m spatial domain vectors and the n frequency domain vectors is not limited in embodiments of the present disclosure. For example, an existing indication manner, for example, but not limited to, 38.214 V16.3.0, may be used to indicate the m spatial domain vectors and the n frequency domain vectors.

In addition, the precoding matrix is constructed based on at least the $K^{NZ}$ non-zero weighting coefficients, the m spatial domain vectors, and the n frequency domain vectors. In other words, in a process of constructing the precoding matrix, another parameter, for example, but not limited to, another non-zero weighting coefficient, another weighting coefficient, or another spatial domain vector and/or another frequency domain vector, may be further used.

It can be learned that the technical solution provided in this embodiment of the present disclosure may be further summarized. $K^{NZ}$ is a quantity of a part of or all non-zero weighting coefficients used in the process of constructing the precoding matrix, and v is the quantity of transport layers or another quantity parameter. In the process of constructing the precoding matrix, these parameters are used.

In a specific implementation process, for the parameters, for example, but not limited to, $K^{NZ}$ and v, refer to the definitions in 38.214 V16.3.0. Certainly, the parameters may alternatively have definitions different from those in 38.214 V16.3.0, for example, but not limited to, another limitation is added or deleted based on the definitions in 38.214 V16.3.0.

In a specific implementation process, the first preset condition is related to a value of a first parameter.

In a specific implementation process, the second preset condition is related to the value of the first parameter.

In a specific implementation process, the first parameter is $\lceil K^{NZ}/2 \rceil$−v.

In a specific implementation process, the first preset condition includes at least the following condition: $\lceil K^{NZ}/2 \rceil$−v>0.

In a specific implementation process, the first preset condition includes at least the following condition: $\lceil K^{NZ}/2 \rceil$−v≥0.

In a specific implementation process, the second preset condition includes at least the following condition: $\lceil K^{NZ}/2 \rceil$−v≤0.

In a specific implementation process, the second preset condition includes at least the following condition: $\lceil K^{NZ}/2 \rceil$−v<0.

It can be learned from the foregoing that a case of $\lceil K^{NZ}/2 \rceil$−v=0 may be included in the first preset condition or the second preset condition based on a specific requirement.

The first manner and the second manner are not limited in this embodiment of the present disclosure. For example, when the first preset condition includes $\lceil K^{NZ}/2 \rceil$−v>0, the first manner may be a manner specified in the current standard. For example, $\lceil K^{NZ}/2 \rceil$−v parameters of a specific type (for example, amplitudes and/or phases) are placed in a group 1 and sent, and another parameter is sent according to another specification of the current standard, for example, by using another group. When the second preset condition includes $\lceil K^{NZ}/2 \rceil$−v≤0, all the parameters of the specific type may be placed in the group 1 and sent, or may be placed in a group 2 and sent. Alternatively, when the second preset condition includes $\lceil K^{NZ}/2 \rceil$−v≤0, the parameters of the specific type and all parameters in the group 2 may be sent by using the group 1. In this case, the group 2 is no longer required. It is not difficult to understand that, in addition to the foregoing manners, the first manner and the second manner may be other manners.

In a specific implementation process, the quantity of transport layers may be indicated by using, for example, but not limited to, an rank indication (RI).

In addition, that the first preset condition or the second preset condition is met should be understood in a broad manner. To be specific, a situation corresponding to a corresponding condition occurs, and it should not be limited to that a related determining operation needs to be performed.

In addition, the indication information is generated in the first manner or the second manner. This may be understood as that the indication information uses a format corresponding to a corresponding manner.

It is not difficult to learn that, according to the technical solution provided in this embodiment of the present disclosure, the parameters related to the precoding matrix may be sent in different manners based on different conditions, to resolve a problem that a current protocol is not perfect, so that a reporting solution is applicable to a plurality of configuration scenarios.

Figure 3:
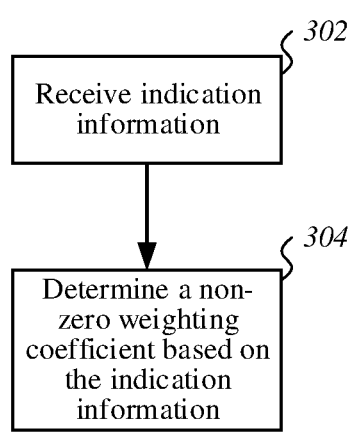
FIG. 3 is an example flowchart of a precoding matrix indication method 300 according to an embodiment of the present disclosure.

FIG. 3 is an example flowchart of a precoding matrix indication method 300 according to an embodiment of the present disclosure. The method 300 is corresponding to the method 200. In a specific implementation process, the method 300 may be performed by, for example, but not limited to, an access device (for example, but not limited to, a base station).

Step 302: Receive indication information. The indication information indicates $K^{NZ}$-v non-zero weighting coefficients, the $K^{NZ}$-v non-zero weighting coefficients belong to $K^{NZ}$ non-zero weighting coefficients, v is a quantity of transport layers, the $K^{NZ}$ non-zero weighting coefficients are used to construct a precoding matrix, and the precoding matrix is constructed based on at least the $K^{NZ}$ non-zero weighting coefficients, m spatial domain vectors, and n frequency domain vectors. The indication information is generated in a first manner when a first preset condition is met, or the indication information is generated in a second manner when a second preset condition is met.

Step 304: Determine the $K^{NZ}$-v non-zero weighting coefficients based on the indication information.

Related technical features included in the method 300 are described above in detail with reference to the method 200. Therefore, details are not described herein again.

Figure 4:
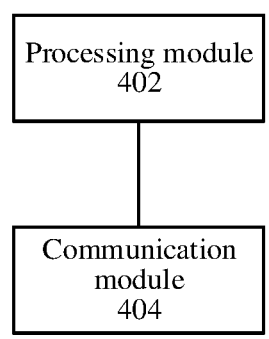
FIG. 4 is an example schematic diagram of a structure of user equipment 400 according to an embodiment of the present disclosure.

FIG. 4 is an example schematic diagram of a structure of user equipment 400 according to an embodiment of the present disclosure. As shown in FIG. 4, the user equipment 400 includes a processing module 402 and a communication module 404. The processing module 402 is configured to perform operation 202 in the method 200, and the communication module 404 is configured to perform operation 204 in the method 200.

Figure 5:
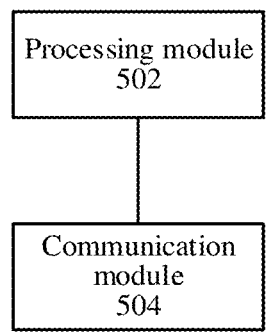
FIG. 5 is an example schematic diagram of a structure of access device 500 according to an embodiment of the present disclosure.

FIG. 5 is an example schematic diagram of a structure of access device 500 according to an embodiment of the present disclosure. As shown in FIG. 5, the access device 500 includes a processing module 502 and a communication module 504. The processing module 502 is configured to perform operation 304 in the method 300, and the communication module 504 is configured to perform operation 302 in the method 300.

It should be noted that, in a specific implementation process, the processing module may be implemented by using a processor, and the communication module 504 may be implemented by using a transceiver.

Figure 6:
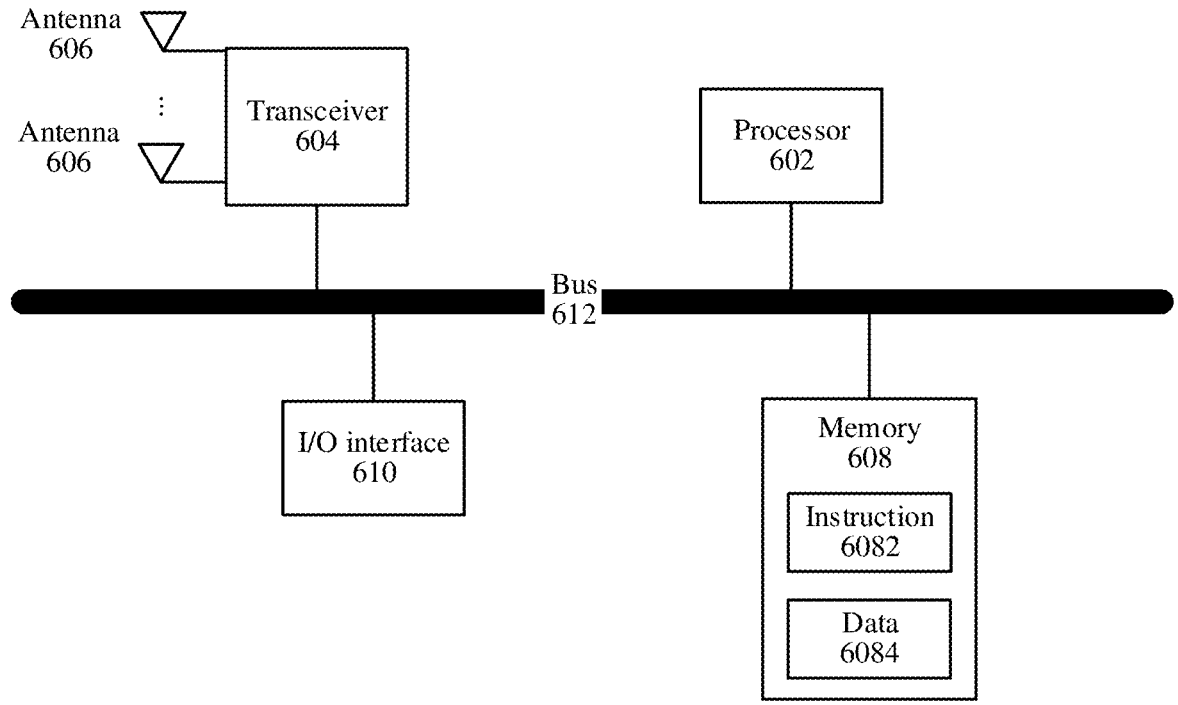
FIG. 6 is an example schematic diagram of a hardware structure of a communication device 600 according to an embodiment of the present disclosure.

FIG. 6 is an example schematic diagram of a hardware structure of a communication device 600 according to an embodiment of the present disclosure. In a specific implementation process, the communication device may be configured to implement the foregoing user equipment, or may be configured to implement the foregoing access device.

As shown in FIG. 6, the communication device 600 includes a processor 602, a transceiver 604, a plurality of antennas 606, a memory 608, an input/output (I/O) interface 610, and a bus 612. The memory 608 is further configured to store instructions 6082 and data 6084. In addition, the processor 602, the transceiver 604, the memory 608, and the I/O interface 610 are communicatively connected to each other through the bus 612, and the plurality of antennas 606 are connected to the transceiver 604. In a specific implementation process, the processor 602, the transceiver 604, the memory 608, and the I/O interface 610 may alternatively be communicatively connected to each other in another connection manner other than the bus 612.

The processor 602 may be a general-purpose processor, for example, but not limited to, a central processing unit (CPU), or may be a dedicated processor, for example, but not limited to, a digital signal processor (DSP), an application-specific integrated circuit (ASIC), and a field programmable gate array (FPGA). In addition, the processor 602 may alternatively be a combination of a plurality of processors. Particularly, in the technical solutions provided in embodiments of the present disclosure, the processor 602 may be configured to perform, for example, an operation performed by the processing module 402 in the user equipment 400 shown in FIG. 4, or an operation performed by the processing module 502 in the access device 500 shown in FIG. 5. The processor 602 may be a processor specially designed to perform the foregoing operations, or may be a processor that performs the foregoing operations by reading and executing the instructions 6082 stored in the memory 608. The processor 602 may need to use the data 6084 in a process of performing the foregoing operations.

The transceiver 604 is configured to: send a signal by using at least one of the plurality of antennas 606, and receive a signal by using at least one of the plurality of antennas 606. Particularly, in the technical solutions provided in embodiments of the present disclosure, the transceiver 604 may be configured to perform, by using at least one of the plurality of antennas 606, for example, an operation performed by the communication module 404 in the user equipment 400 shown in FIG. 4, or an operation performed by the communication module 504 in the access device 500 shown in FIG. 5.

The memory 608 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, or a register. The memory 608 is configured to store the instructions 6082 and the data 6084. The processor 602 may perform the foregoing operations by reading and executing the instructions 6082 stored in the memory 608, and may need to use the data 6084 in a process of performing the foregoing operations.

The I/O interface 610 is configured to: receive instructions and/or data from a peripheral, and output instructions and/or data to the peripheral.

It should be noted that, in a specific implementation process, the communication device 600 may further include other hardware components. The components are not listed one by one in this specification.

In addition, an embodiment of the present disclosure further provides a processor, configured to perform the foregoing methods. In a process of performing the methods, processes of sending the foregoing information and receiving the foregoing information in the foregoing methods may be understood as a process of outputting the foregoing information by the processor and a process of receiving the foregoing input information by the processor. Specifically, when outputting the foregoing information, the processor outputs the information to the transceiver, so that the transceiver performs transmission. That is, the processor transmits the information by using the transceiver. Further, after the information is output by the processor, other processing may further need to be performed on the information before the information arrives at the transceiver. Similarly, when the processor receives the input information, the transceiver receives the information, and inputs the information to the processor. That is, the processor receives the information by using the transceiver. Further, after the transceiver receives the information, other processing may need to be performed on the information before the information is input into the processor.

Based on the foregoing principle, for example, the receiving the indication information mentioned in the foregoing methods may be understood as receiving the input indication information by the processor. For another example, the sending the indication information may be understood as outputting the indication information by the processor.

In this case, for operations such as transmission, sending, and receiving related to the processor, if there is no particular statement, or if the operations do not contradict an actual function or internal logic of the operations in related descriptions, the operations may be more generally understood as operations such as input receiving and output of the processor, instead of operations such as transmission, sending, and receiving directly performed by a radio frequency circuit and an antenna.

In a specific implementation process, the processor may be a processor specially configured to perform these methods, or may be a processor that executes computer instructions in a memory to perform these methods, for example, a general purpose processor. In this case, the processor and the memory belong to a communication device, for example, are included in the communication device. The memory may be a non-transitory memory, for example, a read-only memory (ROM). The memory and the processor may be integrated on a same chip, or may be separately disposed on different chips. A type of the memory and a manner in which the memory and the processor are disposed are not limited in embodiments of the present disclosure.

An embodiment of the present disclosure further provides a computer-readable storage medium, including instructions. When the instructions are run on a computer, the computer is enabled to perform any one of the foregoing methods.

In a specific implementation process, the computer-readable storage medium is non-transitory.

In addition, an embodiment of the present disclosure further provides a computer program product including instructions. When the computer program product is run on a computer, the computer is enabled to perform any one of the foregoing methods.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or functions according to embodiments of the present disclosure are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive Solid State Disk (SSD)), or the like.

In conclusion, the foregoing descriptions are merely embodiments of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A method, comprising:
generating indication information, wherein the indication information indicates $K^{NZ}-v$ non-zero weighting coefficients, the $K^{NZ}-v$ non-zero weighting coefficients belong to $K^{NZ}$ non-zero weighting coefficients, v is a quantity of transport layers, and the $K^{NZ}$ non-zero weighting coefficients are for constructing a precoding matrix, and wherein:
when a first preset condition is met, the indication information further indicates that a group 1 comprises $\lceil K^{NZ}/2 \rceil - v$ first-type parameters, and wherein the first preset condition comprises the following condition: $\lceil K^{NZ}/2 \rceil - v > 0$; or
when a second preset condition is met, the indication information further indicates that a group 2 comprises $K^{NZ}-v$ first-type parameters, wherein the second preset condition comprises the following condition: $\lceil K^{NZ}/2 \rceil - v \leq 0$; and
sending the indication information.

2. The method according to claim 1, wherein:
when the first preset condition is met, the indication information further indicates that the group 2 comprises remaining first-type parameters that are in the $K^{NZ}-v$ first-type parameters and that are other than the $\lceil K^{NZ}/2 \rceil - v$ first-type parameters.

3. The method according to claim 1, wherein each of the first-type parameters comprises an amplitude and a phase.

4. A communication apparatus, comprising:
at least one processor;
at least one memory storing a computer program that, when executed by the at least one processor, causes the communication apparatus to perform at least following operations:
generating indication information, wherein the indication information indicates $K^{NZ}-v$ non-zero weighting coefficients, the $K^{NZ}-v$ non-zero weighting coefficients belong to $K^{NZ}$ non-zero weighting coefficients, v is a quantity of transport layers, and the $K^{NZ}$ non-zero weighting coefficients are for constructing a precoding matrix, and wherein:
when a first preset condition is met, the indication information further indicates that a group 1 comprises $\lceil K^{NZ}/2 \rceil - v$ first-type parameters, wherein the first preset condition comprises the following condition: $\lceil K^{NZ}/2 \rceil - v > 0$; or
when a second preset condition is met, the indication information further indicates that a group 2 comprises $K^{NZ}-v$ first-type parameters, wherein the second preset condition comprises the following condition: $\lceil K^{NZ}/2 \rceil - v \leq 0$; and
sending the indication information.

5. The communication apparatus according to claim 4, wherein when the first preset condition is met, the indication information further indicates that the group 2 comprises remaining first-type parameters that are in the $K^{NZ}-v$ first-type parameters and that are other than the $\lceil K^{NZ}/2 \rceil-V$ first-type parameters.

6. The communication apparatus according to claim 4, wherein each of the first-type parameters comprises an amplitude and a phase.

7. A communications chip comprising at least one processor, wherein the at least one processor is coupled with at least one memory that stores computer instructions, wherein the instructions, when executed by the at least one processor, cause the communications chip to perform at least the following operations:

generating indication information, wherein the indication information indicates $K^{NZ}-v$ non-zero weighting coefficients, the $K^{NZ}-v$ non-zero weighting coefficients belong to $K^{NZ}$ non-zero weighting coefficients, v is a quantity of transport layers, and the $K^{NZ}$ non-zero weighting coefficients are for constructing a precoding matrix, and wherein:

when a first preset condition is met, the indication information further indicates that a group 1 comprises $\lceil K^{NZ}/2 \rceil-v$ first-type parameters, wherein the first preset condition comprises the following condition: $\lceil K^{NZ}/2 \rceil-v>0$; or when a second preset condition is met, the indication information further indicates that a group 2 comprises $K^{NZ}-v$ first-type parameters, wherein the second preset condition comprises the following condition: $\lceil K^{NZ}/2 \rceil-v \leq 0$; and sending the indication information.

8. The communication chip according to claim 7, wherein when the first preset condition is met, the indication information further indicates that the group 2 comprises remaining first-type parameters that are in the $K^{NZ}-v$ first-type parameters and that are other than the $\lceil K^{NZ}/2 \rceil-v$ first-type parameters.

9. The communication chip according to claim 7, wherein each of the first-type parameters comprises an amplitude and a phase.

10. A non-transitory computer-readable storage medium storing computer instructions, that when executed by at least one processor, cause the at least one processor to perform at least following operations:

generating indication information, wherein the indication information indicates $K^{NZ}-v$ non-zero weighting coefficients, the $K^{NZ}-v$ non-zero weighting coefficients belong to $K^{NZ}$ non-zero weighting coefficients, v is a quantity of transport layers, and the $K^{NZ}$ non-zero weighting coefficients are for constructing a precoding matrix, and wherein:

when a first preset condition is met, the indication information further indicates that a group 1 comprises $\lceil K^{NZ}/2 \rceil-v$ first-type parameters, wherein the first preset condition comprises the following condition: $\lceil K^{NZ}/2 \rceil-v>0$; or when a second preset condition is met, the indication information further indicates that a group 2 comprises all first-type parameters, wherein the second preset condition comprises the following condition: $\lceil K^{NZ}/2 \rceil-v \leq 0$; and sending the indication information.

11. The non-transitory computer-readable storage medium according to claim 10, wherein when the first preset condition is met, the indication information further indicates that the group 2 comprises remaining first-type parameters that are in the $K^{NZ}-v$ first-type parameters and that are other than the $\lceil K^{NZ}/2 \rceil-v$ first-type parameters.

12. The non-transitory computer-readable storage medium according to claim 10, wherein each of the first-type parameters comprises an amplitude and a phase.

* * * * *

UNITED STATES PATENT AND TRADEMARK OFFICE
CERTIFICATE OF CORRECTION

PATENT NO. : 12,308,923 B2
APPLICATION NO. : 18/309197
DATED : May 20, 2025
INVENTOR(S) : Wang et al.

It is certified that error appears in the above-identified patent and that said Letters Patent is hereby corrected as shown below:

In the Specification

In Column 7, Line 5, delete "non zero" and insert -- non-zero --.

In Column 7, Line 20, before "or" delete "$-v<0$" and insert -- $-v>0$ --.

In the Claims

In Column 13, in Claim 5, Line 5, delete "$-V$" and insert -- $-v$ --.

Signed and Sealed this
Twenty-fourth Day of June, 2025

Coke Morgan Stewart
*Acting Director of the United States Patent and Trademark Office*